United States Patent
Libal et al.

(10) Patent No.: US 10,795,348 B2
(45) Date of Patent: Oct. 6, 2020

(54) PROVIDING A STANDARD OPERATING PROCEDURE ASSOCIATED WITH A MONITORING SYSTEM OF A FACILITY

(71) Applicant: Honeywell International Inc., Morris Plains, NJ (US)

(72) Inventors: Vit Libal, Prague (CZ); Michelle Raymond, Minneapolis, MN (US); Liana M. Kiff, Minneapolis, MN (US); Henry Chen, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 344 days.

(21) Appl. No.: 15/426,827

(22) Filed: Feb. 7, 2017

(65) Prior Publication Data

US 2017/0146986 A1 May 25, 2017

Related U.S. Application Data

(63) Continuation of application No. PCT/CN2014/083876, filed on Aug. 7, 2014.

(51) Int. Cl.
*G05B 23/02* (2006.01)
*G05B 19/042* (2006.01)

(52) U.S. Cl.
CPC ..... *G05B 23/0208* (2013.01); *G05B 19/0426* (2013.01); *G05B 19/0428* (2013.01);
(Continued)

(58) Field of Classification Search
CPC ............ G05B 23/0208; G05B 19/0426; G05B 19/0428; G05B 2219/31449; G05B 2219/24015
(Continued)

(56) References Cited

U.S. PATENT DOCUMENTS 6,097,429 A * 8/2000 Seeley ............. G08B 13/19602
 348/154
6,470,227 B1 10/2002 Rangachari et al.
(Continued)

FOREIGN PATENT DOCUMENTS

CN 1924909 A 3/2007
CN 1979536 A 6/2007
(Continued)

OTHER PUBLICATIONS

International Search Report from related PCT Application PCT/CN2014/083876 dated Apr. 28, 2015, 4 pp.
(Continued)

*Primary Examiner* — Jigneshkumar C Patel

(74) *Attorney, Agent, or Firm* — Seager, Tufte & Wickhem, LLP

(57) ABSTRACT

Methods, devices, and systems for providing a standard operating procedure associated with a monitoring system of facility are described herein. One method includes determining a plurality of parameters associated with a facility having a monitoring system, accessing a library of SOP templates to determine a particular SOP template having a correlation with the plurality of parameters, allowing a user to create an SOP by customizing the particular SOP template, and associating the created SOP with the plurality of parameters.

14 Claims, 3 Drawing Sheets

(52) U.S. Cl.
CPC .............. *G05B 2219/24015* (2013.01); *G05B 2219/31449* (2013.01)

(58) Field of Classification Search
USPC .......................................................... 700/89
See application file for complete search history.

(56) References Cited

U.S. PATENT DOCUMENTS

| | | | |
|---|---|---|---|
| 7,324,905 | B2 | 1/2008 | Droubie et al. |
| 2002/0193969 | A1* | 12/2002 | Frantz ...................... F02C 9/00 702/188 |
| 2006/0294536 | A1 | 12/2006 | Hambrick et al. |
| 2008/0040191 | A1* | 2/2008 | Chakravarty .......... G06Q 10/06 705/7.15 |
| 2009/0177707 | A1* | 7/2009 | Devraj .................. G06F 16/217 |
| 2010/0247082 | A1* | 9/2010 | Caldwell ............ G05B 23/0264 386/326 |
| 2012/0159389 | A1* | 6/2012 | Keith ..................... G06Q 10/00 715/810 |
| 2012/0196264 | A1 | 8/2012 | Lin et al. |

FOREIGN PATENT DOCUMENTS

| | | |
|---|---|---|
| JP | 4613770 B2 | 2/2011 |
| JP | 2013097443 A | 5/2013 |
| WO | 2009020472 A1 | 2/2009 |

OTHER PUBLICATIONS

Extended Search Report and Written Opinion from related European Patent Application No. 14899138, dated Aug. 9, 2018, 7 pages.

\* cited by examiner

PROVIDING A STANDARD OPERATING PROCEDURE ASSOCIATED WITH A MONITORING SYSTEM OF A FACILITY

CROSS REFERENCE TO RELATED APPLICATION

This application claims priority to PCT Application No. PCT/CN2014/083876, filed Aug. 7, 2014, which is incorporated herein by reference in its entirety.

TECHNICAL FIELD

The present disclosure relates to methods, devices, and systems for providing a standard operating procedure associated with a monitoring system of facility.

BACKGROUND

A Standard Operating Procedure (SOP) includes steps (e.g., actions, decisions, etc.) prescribed to be performed in response to an event which may include an incident and/or a particular set of conditions. Facilities (e.g., buildings, plants, refineries, etc.) may have a respective SOP (or set of SOPs) in place for each of a number of events that may take place. Facility monitoring systems, for example, may employ several SOPs for different possible events (e.g., intruder detected, access to a particular area denied, etc.).

In previous approaches, SOPs may be designed from scratch when a monitoring system is deployed in a facility. In other words, previous approaches may disregard the fact that similar existing system deployments may already utilize similar SOPs. In such approaches, SOP quality may depend on the knowledge and/or experience of a designer of the SOP rather than through the leveraging of accumulated knowledge more likely to produce repeatable results.

DETAILED DESCRIPTION

Figure 1:
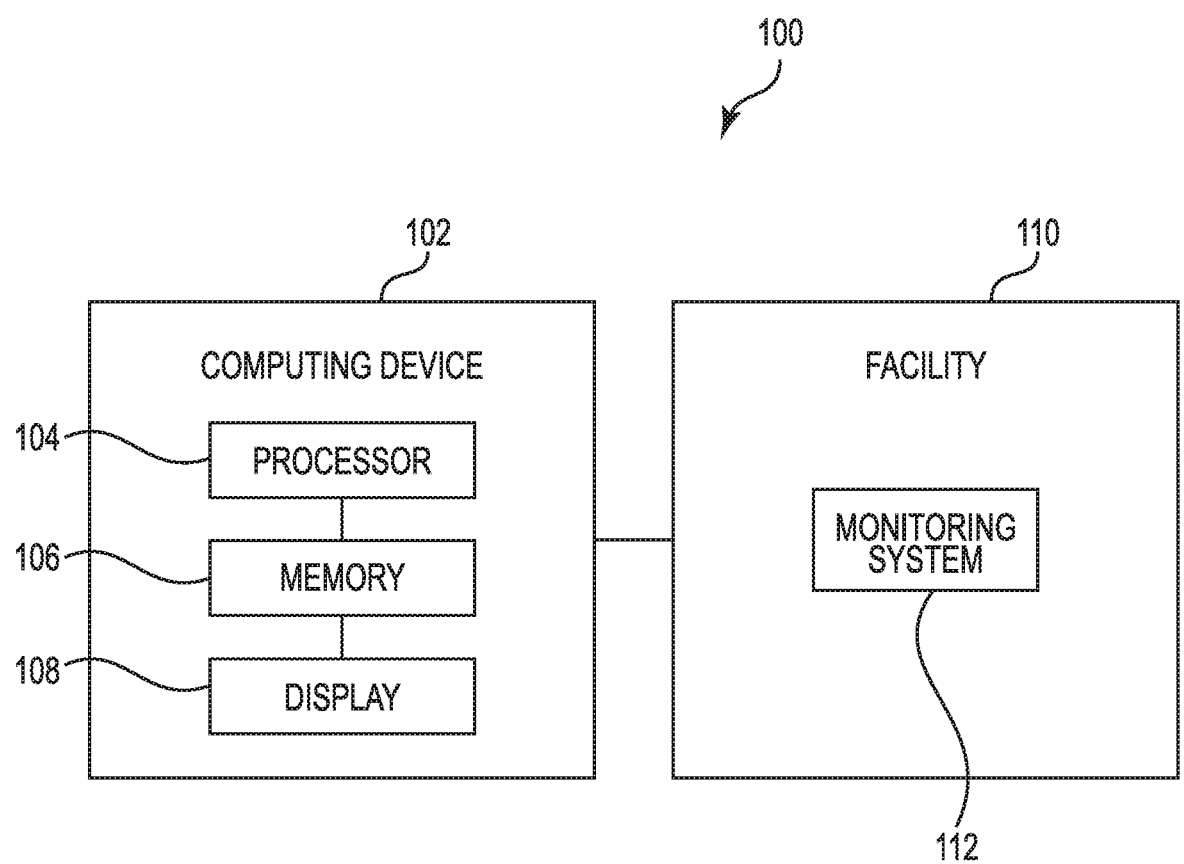
FIG. 1 illustrates a system for providing an SOP associated with a monitoring system of facility in accordance with one or more embodiments of the present disclosure.

Devices, methods, and systems for providing an SOP associated with a monitoring system of facility are described herein. For example, one or more embodiments include determining a plurality of parameters associated with a facility having a monitoring system, accessing a library of SOP templates to determine a particular SOP template having a correlation with the plurality of parameters, allowing a user to create an SOP by customizing the particular SOP template, and associating the created SOP with the plurality of parameters.

Embodiments of the present disclosure can provide an SOP associated with a monitoring system of facility. As used herein, providing an SOP can include creating, customizing, handling, operating, managing, and/or executing an SOP.

By leveraging the commonalities of SOPs across various facilities and/or systems, embodiments of the present disclosure can improve efficiency and quality of the SOP design process. Whereas, in previous approaches users may design SOPs from scratch, embodiments of the present disclosure can provide access to a library of SOP templates, allowing users to capitalize on previous knowledge and/or success associated with existing SOPs. A user can access the library of SOP templates to find an appropriate template, and then customize the template to suit the needs of the particular system and/or facility. Accordingly, embodiments of the present disclosure can yield substantial savings in design costs.

Further, embodiments of the present disclosure can enable a user to manage SOPs during the design and execution phases using a display configured to provide the user with relevant and timely information. By illustrating SOP dependencies, the display can enable faster decision making and improve both efficiency and effectiveness of the design and the execution of various SOPs.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of blocks" can refer to one or more blocks.

FIG. 1 illustrates a system 100 for providing an SOP associated with a monitoring system of facility in accordance with one or more embodiments of the present disclosure. As shown, system 100 can include a computing device 102 communicatively coupled to a facility 110. A communicative coupling can be a wired and/or wireless connection allowing information to be communicated in any direction between the computing device 102 and the facility 110.

It is noted that though the computing device 102 and the facility 110 are shown as being logically separated, embodiments of the present disclosure are not so limited (e.g., computing device 102 can be located in the facility 110 and/or comprise a portion of the facility 110). Further, though a single computing device and facility are shown, embodiments of the present disclosure are not limited to a particular number of either computing devices or facilities. In some embodiments, for example, computing device 102 can manage a plurality of facilities.

Computing device 102 can be, for example, a laptop computer, a desktop computer, or a mobile device (e.g., a mobile phone, a personal digital assistant, etc.), among other types of computing devices.

As shown in FIG. 1, computing device 102 includes a memory 106 and a processor 104 coupled to memory 106. Memory 106 can be any type of storage medium that can be accessed by processor 104 to perform various examples of the present disclosure. For example, memory 106 can be a non-transitory computer readable medium having computer readable instructions (e.g., computer program instructions) stored thereon that are executable by processor 104 to provide an SOP associated with a monitoring system of facility in accordance with one or more embodiments of the present disclosure.

Memory 106 can be volatile or nonvolatile memory. Memory 106 can also be removable (e.g., portable) memory, or non-removable (e.g., internal) memory. For example, memory 106 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 106 is illustrated as being located in computing device 102, embodiments of the present disclosure are not so limited. For example, memory 106 can also be located internal to another computing resource (e.g., enabling computer readable instructions to be downloaded over the Internet or another wired or wireless connection).

Computing device 102 includes a display 108. The display 108 (e.g., screen) can be configured to display one or more embodiments herein for instance. Though display 108 is shown as being included in computing device 102, display 108 can be external to computing device 102.

In some embodiments, the display 108 can be a head-mounted display (HMD), for instance (e.g., head-mounted glasses). In other embodiments, the display can be a video wall. In such a display, a user (e.g., a security operator) can simultaneously display information from multiple facility systems on an interactive interface (e.g., video wall). In other embodiments, the display 108 can be a mobile device (e.g., mobile phone, tablet, personal digital assistant (PDA), etc.). In various embodiments, more than one display can be utilized. The display can be, for instance, a touch-screen (e.g., the display can include touch-screen capabilities).

The display 108 can provide (e.g., display and/or present) information to a user (e.g., a user using computing device 102). Computing device 102 can receive information from a user through an interaction with the user via the display 108. For example, computing device 102 can receive inputs from the user via the display 108. The user can enter the input into computing device 102 using, for instance, a mouse and/or keyboard associated with computing device 102, or by touching the display in embodiments in which the display includes touch-screen capabilities (e.g., embodiments in which the display is a touch screen).

The facility 110 can be a number of structures (e.g., portions and/or combinations of structures) and facilities in accordance with embodiments herein are not limited to particular types of facilities. For example, the facility 110 can be a building, a plant, an installation, a refinery, etc.

The facility 110 includes a monitoring system 112. The monitoring system 112 can include one or more building systems configured to monitor various aspects of the facility 112. For example, the monitoring system 112 can include an access control system, a video surveillance system, an occupancy detection system, and/or other systems. The monitoring system 112 can be a safety and/or security system of the facility 110 and/or a system for monitoring a manufacturing process within the facility 110, among others.

Figure 2:
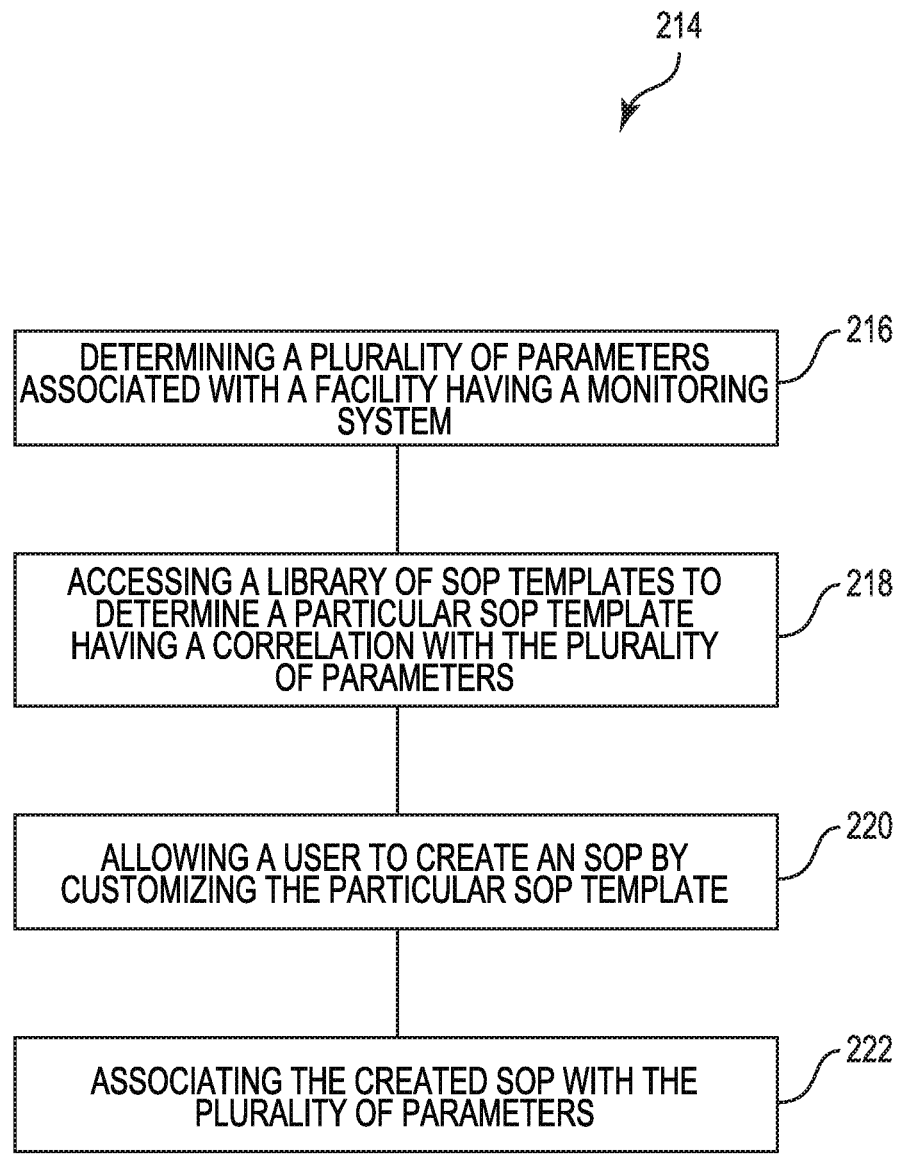
FIG. 2 illustrates a method for providing an SOP associated with a monitoring system of facility in accordance with one or more embodiments of the present disclosure.

FIG. 2 illustrates a method 214 for providing an SOP associated with a monitoring system of facility in accordance with one or more embodiments of the present disclosure. Method 214 can be performed, for example, by a computing device, such as computing device 102 previously described herein (e.g., in connection with FIG. 1).

At block 216, method 214 includes determining a plurality of parameters associated with a facility having a monitoring system. Parameters can include aspects and/or characteristics of a facility and/or a monitoring system associated therewith. Parameters can allow the comparison of various facilities to determine similarities and/or differences between facilities. For example, parameters can include parameters associated with the facility itself, such as a type of the facility (e.g., hospital, refinery, etc.), a size of the facility, a purpose of the facility, etc.

Additionally, parameters can include parameters associated with the monitoring system of the facility, such as a size of the monitoring system, a required security level of one or more areas of the monitoring system, a structure of the monitoring system, actors of the monitoring system (e.g., security personnel, operators, managers, etc.), subsystems of the monitoring system (e.g., video surveillance systems, access control systems, etc.), devices used in the monitoring system, and/or others.

Parameters can be determined based on user inputs and/or from a building information model (BIM) associated with the facility, for instance. Parameters can be determined based on blueprints of the facility and/or installation records of a monitoring system, for example, among others. Determining parameters can include categorizing the facility and/or the monitoring system as one of a plurality of categories (e.g., using clustering and/or decision trees), for instance.

At block 218, method 214 includes accessing a library of SOP templates to determine a particular SOP template having a correlation with (e.g., corresponding to) the plurality of parameters (e.g., a correlation that exceeds a particular threshold). As previously discussed, embodiments of the present disclosure can provide a library of SOP templates (referred to herein as an "SOP template library"). Such a library can be stored in memory, for instance (e.g., memory 106 previously described in connection with FIG. 1). The library can be searchable such that SOP templates can be determined based on one or more parameters and/or categories.

The SOP template library can contain a plurality of SOP templates. SOP templates can be data structures containing specifications of tasks and/or actions that form the generic parts of each SOP of a certain facility and/or monitoring system category. Each SOP template can include an identifier, a name, a description, a category, and/or an identifier of the SOP purpose (e.g., type and/or conditions of the event(s) in response to which the SOP associated with the template is executed). The tasks and/or actions of each SOP template can be specified using one or more workflows (e.g., using Business Process Model and Notation (BPMN)) and/or ontology.

SOP templates can be associated with events. Events, as referred to herein, can include events and/or conditions in a facility that when determined (e.g., observed, detected, and/or otherwise found) dictate a response by an appropriate sequence of follow-up actions (e.g., an SOP) which, when executed, lead to fulfilling an objective of a monitoring system (e.g., maintaining safety and/or security). In some embodiments, each SOP template can be associated with a respective event. In other embodiments, a particular event can have a plurality of SOPs associated therewith (e.g., responsive thereto). Events can include, for example, access being denied to a particular area of the facility by a particular user (e.g., the user attempted to access part of the facility where the user was not allowed access), the detection of an intruder in the facility, the detection of a changed status, the detection of particular condition, etc.

Determining a particular SOP template having a correlation with the plurality of parameters can include determining a particular SOP template in a same category as the facility and/or the monitoring system, for instance. Determining a particular SOP template having a correlation with the plurality of parameters can include determining that the parameters associated with the facility exceed a threshold level of similarity with respect to the corresponding parameters associated with the particular SOP template.

At block 220, method 214 includes allowing a user to create an SOP by customizing the particular SOP template. Once determined, the particular SOP template correlating with the plurality of parameters (e.g., the selected SOP template) can be customized (e.g., added to, subtracted from, modified, specified, etc.). Customizing can be carried out by a user, for instance, though in various embodiments, portions of customizing can be carried out automatically (e.g., without user input). In various embodiments, an SOP associated with a facility can include a template (e.g., generic) portion applicable to a plurality of facilities and a custom (e.g., customized) portion unique to the facility.

The custom portion can include a portion determined based, at least in part, on a BIM associated with the facility. For example, the selected SOP template can be customized depending on the layout of the facility. The custom portion can include a portion determined based, at least in part, on knowledge from a user regarding the monitoring system of the facility and/or the facility itself. For example, a user can input contact information of security staff and/or SOP steps that may be unique to the particular facility. User inputs can be made using the display 108 of the computing device 102 previously described in connection with FIG. 1. Content of the display 108 is discussed below in connection with FIG. 3.

At block 222, method 214 includes associating the created SOP with the plurality of parameters. Associating the created SOP with the plurality of parameters can include causing the created SOP template to execute responsive to the determination of a particular event (or events). The association can be stored in memory, for instance, such as the memory 106, previously discussed.

Figure 3:
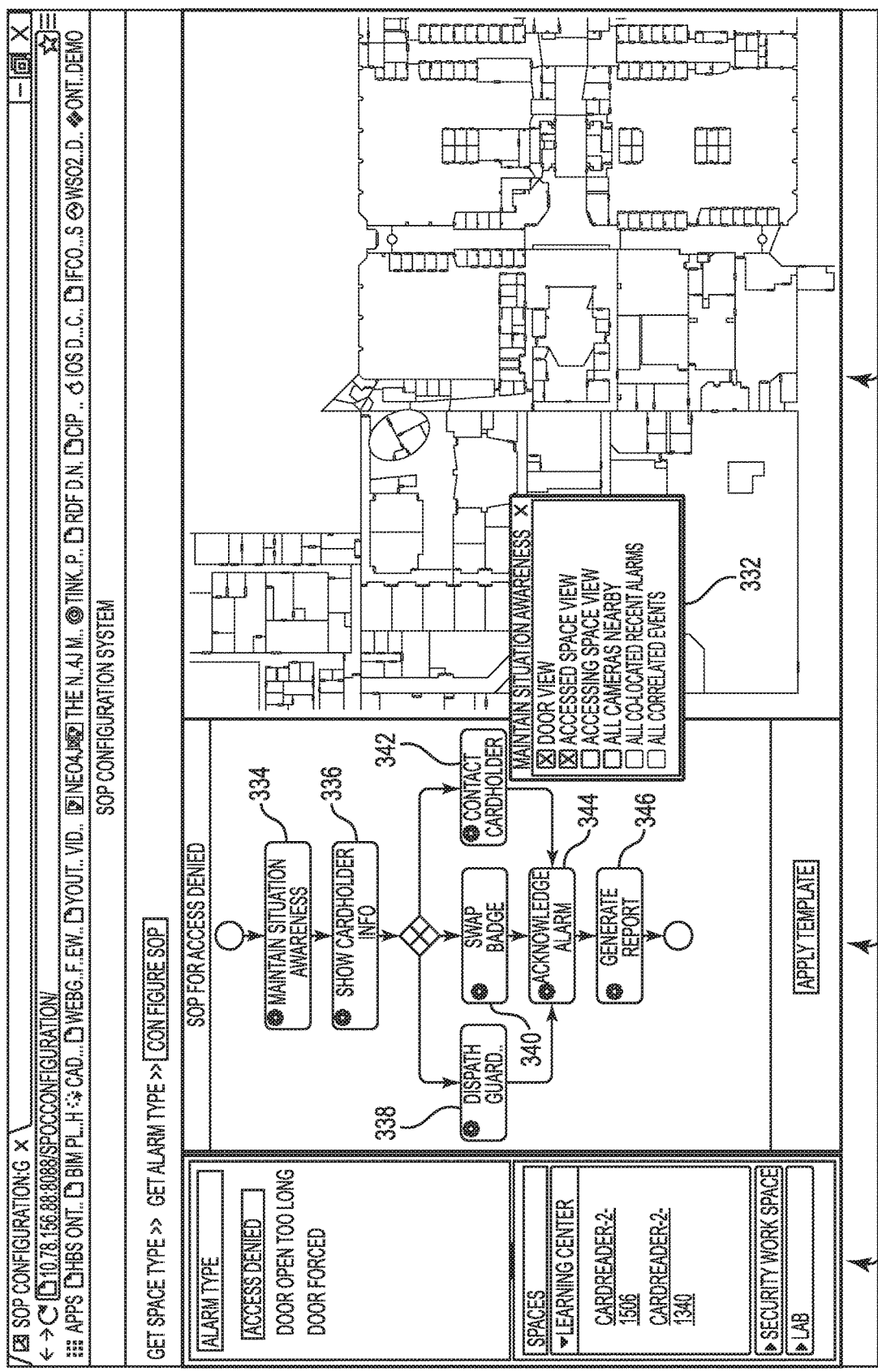
FIG. 3 illustrates an example display for providing an SOP associated with a monitoring system of facility in accordance with one or more embodiments of the present disclosure.

FIG. 3 illustrates an example display 324 for providing an SOP associated with a monitoring system of facility in accordance with one or more embodiments of the present disclosure. The display 324 can be displayed using a display device, for instance, such as display 108 previously described in connection with FIG. 1. The display 324 can be used during creation (e.g., creation and/or customization) of an SOP, for instance. The display 324 can also be used during execution of an SOP. In some embodiments, the display 324 can be initialized responsive to the determination of an event (previously discussed).

The display 324 includes a first window (herein referred to as an "SOP workflow window") 326, a second window (herein referred to as a "spatial relation window") 328, a third window (herein referred to as an "information window") 330, and a fourth window (herein referred to as a "view control window") 332. The example windows shown in FIG. 3 are included for purposes illustration; embodiments of the present disclosure are not limited to particular numbers and/or types of windows. Further, while the windows illustrated in FIG. 3 are provided on a same display (e.g., screen), embodiments of the present disclosure are not limited to a single display.

The SOP workflow window 326 can display an SOP (e.g., an SOP workflow) using BPMN, for instance. The SOP can include a plurality of steps. The SOP workflow window can enable a user to see and/or modify content of each SOP step. In the example illustrated in FIG. 3, the SOP workflow window 326 includes an SOP workflow associated with an event (referred to in the example illustrated in FIG. 3 as an "incident") of "access denied," the steps of which are discussed further below.

The spatial relation window 328 can display a rendering of a portion of the facility associated with the incident, for instance. The spatial relation window 328 can be used to visualize protected spaces and/or spatial relations between the protected spaces. Spatial relations can be displayed among those elements of a monitoring system information model used in a particular step of an SOP. For example, in some embodiments, the spatial relation window 328 can display a rendering of a floor plan of the facility with highlighted security zones and/or security devices (e.g., sensors, cameras, etc.) that determined the incident.

The information window 330 can display other information and/or relations among those elements of the monitoring system information model that may be used in a particular step of the SOP (e.g., information relevant to one or more steps of the SOP). That is, information window 330 can display information relevant to the incident and the SOP (e.g., responsive to the incident being detected).

In some embodiments, information window 330 can display temporally-related information, such as intrusion detection logs occurring prior to the incident. In other embodiments information window 330 can include a timeline of an incident and/or an SOP associated with the incident such that a user can view a sequence of events leading up to the present.

The view control window 332 can allow the user to modify the views provided by the spatial relation window 328. For example, the user can activate and/or deactivate various views presented in the rendering. Further, the user can cause one or more camera feeds to be displayed (e.g., along with the rendering) in spatial relation window 328.

Once the incident (e.g., "access denied") has been determined, an SOP can be executed. Referring to the example SOP illustrated in FIG. 3, at step 334, situational awareness is maintained. For example, embodiments of the present disclosure can retrieve information relevant to the incident. Such information can be displayed using information window 330, for instance. The information can include, for example, camera feeds, location(s) of users (e.g., cardholders) attempting access (e.g., determined based on an identification card associated with each user), etc.

At step 336, information associated with the cardholder can be displayed (e.g., using information window 330).

Cardholder information can include, for example, name, job title, photograph, access rights, access history, etc.

Subsequent to step 336, a decision can be made based on a status of the cardholder's card. For example, if the card is determined to have been lost by the cardholder (e.g., previously reported as lost by the cardholder), a guard can be dispatched at step 338 and/or the cardholder can be contacted at step 342 (e.g., via email, phone, and/or by direct contact with a guard). Contacting the cardholder can allow the determination as to whether the cardholder has since recovered the card or if a nefarious entity has taken possession of the card, for instance.

Alternatively, if the card has been inadvertently deactivated and/or otherwise made ineffective, embodiments of the present disclosure can begin a process of swapping the cardholder's card for a new card at step 340.

Responsive to the appropriate action(s) having been taken, (e.g., the previous steps of the SOP completed) embodiments of the present disclosure can acknowledge (e.g., deactivate) an alarm condition associated with the incident at step 344. Thereafter, a report concerning the incident and the use of the SOP to resolve the incident can be generated at step 346.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for providing a standard operating procedure (SOP) associated with a monitoring system of a facility, comprising:
   determining a plurality of parameters associated with a facility having a monitoring system;
   accessing a library of customizable SOP templates associated with events;
   comparing the plurality of parameters associated with the facility and corresponding parameters associated with the customizable SOP templates to a threshold level of similarity;
   determining a particular customizable SOP template associated with an event by identifying a correlation with the plurality of parameters associated with the facility, the particular customizable SOP template is determined to have a correlation with the plurality of parameters associated with the facility when the plurality of parameters associated with the facility and the corresponding parameters associated with the particular customizable SOP template exceed the threshold level of similarity;
   allowing a user to create an SOP associated with the event by customizing the particular customizable SOP template;
   associating the created SOP with the plurality of parameters;
   detecting with the monitoring system an occurrence of a particular event in the facility;
   determining the particular event in the facility matches the event associated with the created SOP; and
   causing the created SOP to execute responsive to the particular event in the facility being detected and matching the event associated with the created SOP.

2. The method of claim 1, wherein the monitoring system is a security system of the facility.

3. The method of claim 1, wherein the plurality of parameters associated with the facility and used to determine a correlation with the particular customizable SOP template associated with an event include:
   a type of the facility;
   a size of the facility; and
   a purpose of the facility.

4. The method of claim 1, wherein the plurality of parameters associated with the facility and used to determine a correlation with the particular customizable SOP template associated with an event include:
   a size of the monitoring system;
   a security level of at least one area of the monitoring system; and
   a structure of the monitoring system.

5. The method of claim 1, wherein determining the plurality of parameters associated with the facility includes categorizing the facility as one of a plurality of categories, and wherein accessing the library of SOP templates to determine the particular SOP template having the correlation with the plurality of parameters includes determining that the particular SOP template corresponds to one of the plurality of categories.

6. The method of claim 1, wherein each SOP template of the library of SOP templates includes a respective name, identifier, description, and category.

7. The method of claim 1, wherein each SOP template of the library of SOP templates is associated with a respective event in the facility.

8. The method of claim 1, wherein the library is configured to be searched based on at least one of the plurality of parameters.

9. The method of claim 1, wherein the method includes automatically customizing a portion of the particular SOP template based on the parameters without any input made by a user.

10. A non-transitory computer readable medium having computer readable instructions stored thereon that are executable by a processor to:
   determine a plurality of parameters associated with a facility having a monitoring system;
   access a library of customizable SOP templates associated with events;

compare the plurality of parameters associated with the facility and corresponding parameters associated with the customizable SOP templates to a threshold level of similarity;

determine a particular customizable SOP template associated with an event by identifying a correlation with the plurality of parameters associated with the facility, the particular customizable SOP template is determined to have a correlation with the plurality of parameters associated with the facility when the plurality of parameters associated with the facility and the corresponding parameters associated with the particular customizable SOP template exceed the threshold level of similarity;

allow a user to create an SOP associated with the event by customizing the particular customizable SOP template;

associate the created SOP with the plurality of parameters;

detect with the monitoring system an occurrence of a particular event in the facility;

determine the particular event in the facility matches the event associated with the created SOP; and cause the created SOP to execute responsive to the particular event in the facility being detected and matching the event associated with the created SOP.

11. The computer readable medium of claim 10, wherein the instructions executable by the processor further generate a report concerning the particular event responsive to the execution of the created SOP.

12. The computer readable medium of claim 10, wherein the instructions executable by the processor further receive inputs by a user during the execution of the created SOP.

13. The computer readable medium of claim 10, wherein the plurality of parameters associated with the facility and used to determine a correlation with the particular customizable SOP template associated with an event include:
 a type of the facility;
 a size of the facility; and
 a purpose of the facility.

14. The computer readable medium of claim 10, wherein the instructions executable by the processor automatically customize a portion of the particular SOP template based on the parameters without any input made by a user.

* * * * *